United States Patent
Ling et al.

(10) Patent No.: US 8,949,907 B2
(45) Date of Patent: *Feb. 3, 2015

(54) METHOD AND SYSTEM FOR PROVIDING A HOME CABLE NETWORK

(71) Applicant: Maxlinear, Inc., Carlsbad, CA (US)

(72) Inventors: Curtis Ling, Carlsbad, CA (US);
Timothy Gallagher, Carlsbad, CA (US)

(73) Assignee: Maxlinear, Inc., Carlsbad, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/462,871

(22) Filed: Aug. 19, 2014

(65) Prior Publication Data

US 2014/0359674 A1 Dec. 4, 2014

Related U.S. Application Data

(63) Continuation of application No. 13/301,409, filed on Nov. 21, 2011, now Pat. No. 8,813,135.

(51) Int. Cl.
*H04N 7/20* (2006.01)
*H04N 7/10* (2006.01)
*H04N 21/2381* (2011.01)

(52) U.S. Cl.
CPC ............ *H04N 7/106* (2013.01); *H04N 21/2381* (2013.01)
USPC ............................... 725/68; 725/117; 725/126

(58) Field of Classification Search
CPC .................................................. H04N 21/2381
USPC ................................ 725/68, 80, 106, 117, 126
See application file for complete search history.

(56) References Cited

U.S. PATENT DOCUMENTS

| | | | | |
|---|---|---|---|---|
| 2008/0120667 | A1* | 5/2008 | Zaltsman | 725/110 |
| 2010/0027411 | A1* | 2/2010 | Weber et al. | 370/216 |
| 2010/0100918 | A1* | 4/2010 | Egan et al. | 725/111 |
| 2010/0251312 | A1* | 9/2010 | Albano et al. | 725/78 |
| 2011/0002245 | A1* | 1/2011 | Wall et al. | 370/297 |
| 2011/0047581 | A1* | 2/2011 | Caspi et al. | 725/80 |
| 2011/0255452 | A1* | 10/2011 | Brooks | 370/297 |
| 2011/0258678 | A1* | 10/2011 | Cowling et al. | 725/125 |
| 2011/0277001 | A1* | 11/2011 | Kaluskar et al. | 725/80 |
| 2012/0054805 | A1* | 3/2012 | Shafer et al. | 725/78 |
| 2012/0243621 | A1* | 9/2012 | Hurwitz et al. | 375/257 |
| 2013/0077544 | A1* | 3/2013 | Gomez et al. | 370/297 |
| 2013/0091533 | A1* | 4/2013 | Wells et al. | 725/149 |

OTHER PUBLICATIONS

MoCABlog "You Say MoCA, I Say DECA—Which Is It?", Aug. 2, 2010.*

* cited by examiner

*Primary Examiner* — Junior Mendoza
(74) *Attorney, Agent, or Firm* — McAndrews, Held & Malloy

(57) ABSTRACT

Methods and systems for cross-protocol time synchronization may comprise, for example, in a premises-based network, receiving, by a root node network controller in the premises, signals that conform to one or more first communications protocols, where the signals may be received from sources external to the premises. The received signals may be bridged to conform to a second communications protocol different from the first communications protocol. The bridged signals may be communicated to one or more networked devices within the premises-based wired network, where only signals conforming to the second communications protocol may be concurrently communicated in at least two frequencies, a first in a frequency range of the first communications protocol and a second in a frequency range of the second communications protocol, the frequency range used by the first communications protocol being different from and not overlapping with the frequency range used by the second communications protocol.

20 Claims, 8 Drawing Sheets

METHOD AND SYSTEM FOR PROVIDING A HOME CABLE NETWORK

CROSS-REFERENCE TO RELATED APPLICATIONS/INCORPORATION BY REFERENCE

This application is a continuation of application Ser. No. 13/301,409 filed on Nov. 29, 2011, which is incorporated herein by reference in its entirety.

FIELD OF THE INVENTION

Certain embodiments of the invention relate to communication networks. More specifically, certain embodiments of the invention relate to a method and system for providing a home cable network.

BACKGROUND OF THE INVENTION

Although computer networks have been in existence for decades, they only recently became commonplace in homes. Wired networks over various types of wire and cable as well as wireless networks over consumer wireless routers have been developed for use in residential applications.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for providing a premises-based wired network (e.g., a home cable network), substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain aspects of the invention may be found in a method and system for providing a home cable network. Exemplary aspects of the invention may comprise receiving by a root node network controller in a premises-based wired network, signals that conform to one or more first communications protocols, where the signals may be received from sources external to the premises. The received signals may be bridged to conform to a second communications protocol and communicated to one or more networked devices comprising a television set top box downstream from the root node device within the premises-based network, where only signals conforming to the second communications protocol may be communicated over the premises-based wired network. The first communications protocol signals may, for example, comprise data over cable service interface specification (DOCSIS) signals, cable television signals, satellite television signals, fiber-to-the-home signals, and/or digital subscriber (DSL) signals. The second communications protocol may, for example, comprise a multimedia over cable alliance (MoCA) standard, an Ethernet protocol, or a power line communications protocol. The premises-based wired network may, for example, comprise coaxial cables. The bridged signals may, for example, be communicated to one or more networked devices at a frequency that is independent of the one or more first communications protocols. The frequency may be configured utilizing the root node network controller.

Figure 1A:
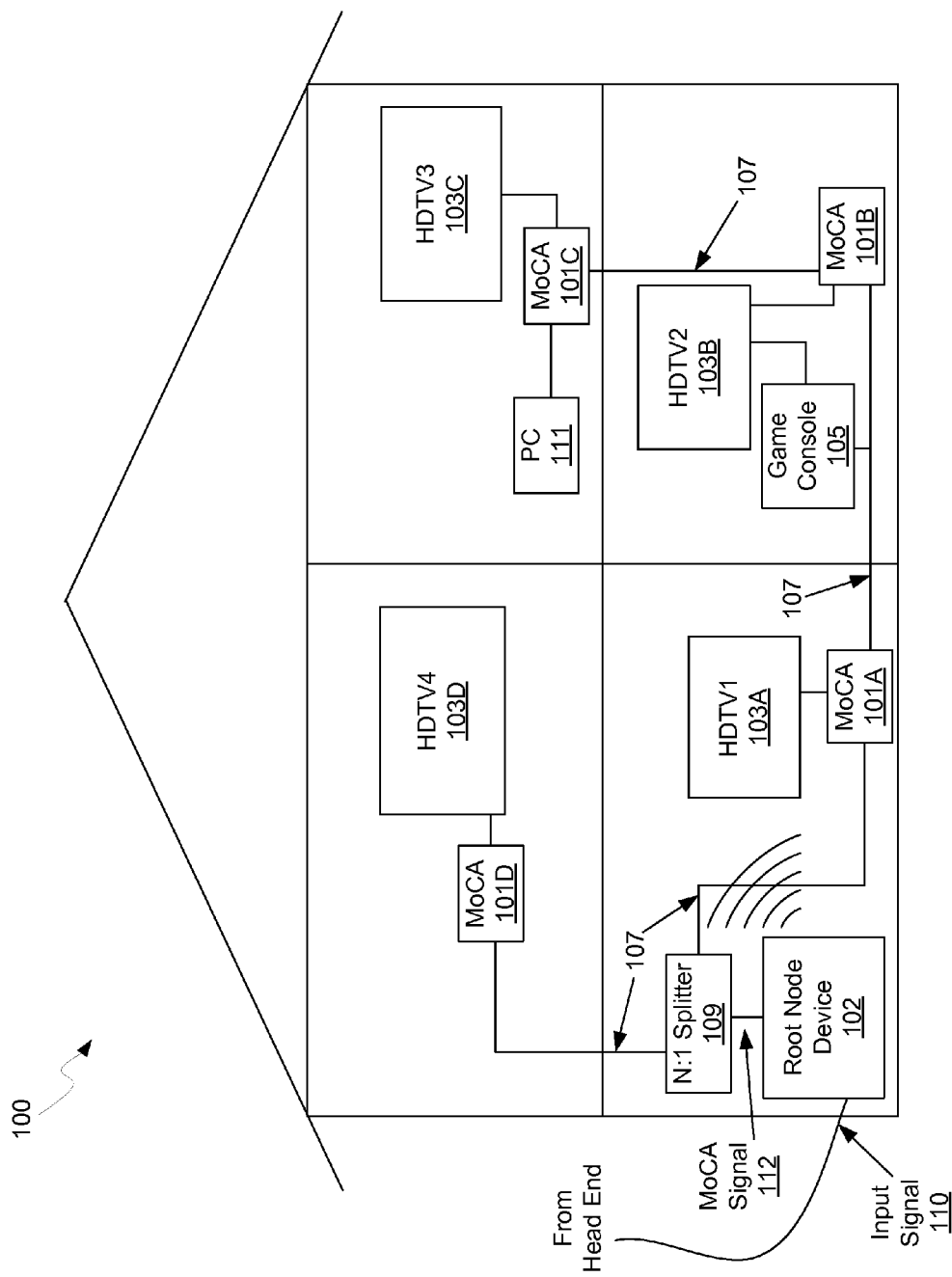
FIG. 1A is a diagram illustrating an exemplary dwelling-based network, in accordance with an embodiment of the invention.

FIG. 1A is a diagram illustrating an exemplary dwelling-based network, in accordance with an embodiment of the invention. Referring to FIG. 1A, there is shown a dwelling-based wired network 100 spanning a plurality of rooms in the dwelling, where each one may have one or more networked devices. There is also shown Multimedia over Cable Alliance (MoCA) devices 101A-101D, a root node device 102, high-definition televisions (HDTVs) 103A-103D, a game console 105, an N:1 splitter 109, a personal computer 111, coaxial cables 107, and an input signal 110. The input signal 110 may be provided by a cable head-end, a fiber-to-the-home service, digital subscriber line (DSL) service, or a satellite signal source, for example. The MoCA devices 101A-101D are, for example, downstream from the root node 102 in the premises-based wired network (e.g., "downstream" meaning from the root node 102 toward the leaf nodes of the premises-based wired network, and "upstream" meaning from the leaf modes of the premises-based wired network toward the root note device 102, or toward the head end outside of the premises). Though only a single N:1 splitter 109 is illustrated in FIG. 1A, the network may comprise a plurality of splitters in the home, for example all downstream from the root node device 102.

The MoCA devices 101A-101D (or general MoCA devices) may comprise network devices that enable a secure wired network utilizing the coaxial cables 107 in the dwelling wired network 100. The MoCA devices 101A-101D may, for example, be stand-alone apparatus or may be incorporated in other devices (e.g., televisions, PVR, STBs, PCs, network attached storage (NAS) devices, etc.). The MoCA devices 101A-101D may operate under the MoCA 1.x or 2.x specification, for example, and may communicate signals between devices in both the 1-2 GHz frequency range when operating with a cable TV signal or ~400-900 MHz when operating with a satellite TV signal. In an exemplary embodiment of the invention, the MoCA devices 101A-101D may receive MoCA signals from the root node device 102 in any frequency range supported by the coaxial cables 107. Other communication protocols may be utilized on the same coaxial cables 107.

The root node device 102 may comprise a network controller in the wired network, coordinating the wired network communications as per the MoCA standard. The root node device 102 may comprise a device comprising a MoCA network controller system-on-chip (SoC), or may comprise a SoC itself. The root node device 102 may also comprise some wireless capability and as such may configure wireless network communications via a wireless network protocol, such as 802.11x (i.e., any one or more of 802.11a, 802.11b, 802.11g, 802.11n, 802.11ac, etc.). The root node 102 may receive signals from a head end, and accordingly may be operable to receive cable, satellite, digital subscriber line (DSL), fiber optic, or other communications protocols utilized by service providers to provide services to the dwelling.

The root node device 102 may comprise one or more bridges for converting the received signals to a MoCA signal, and therefore, the signals communicated in the dwelling-based wired network 100 may comprise MoCA signals only, so that the root node device 102 may utilize the entire spectrum supported by the coaxial cables 107 when communicating to the MoCA devices 101A-101D, the HDTVS 103A-103D, the game console 105, and/or the PC 111. Note that in various other exemplary networks, portions of the spectrum (e.g., portions of the spectrum that are generally not utilized for MoCA communication) may be allocated for other uses.

In another exemplary scenario, one or more of the MoCA devices 101A-101D may also comprise a network controller in the wired network, coordinating the wired network communications as per the MoCA standard. For example, one of the MoCA devices 101A-101D may operate as a backup MoCA network controller. In another exemplary embodiment, one or more of the MoCA devices 101A-101D may be operable to provide a WLAN network.

Cable television signals, including data over cable service interface specification (DOCSIS) signals, may be communicated in the 50 MHz to 1 GHz range, for example. The cable range generally has about 150 6-MHz TV channels, some of which are allocated to DOCSIS, some to digital television, and some to analog television. DOCSIS based communication may, for example, be used to provide Internet access to the cable subscriber.

The MoCA devices 101A-101D may be operable to provide wireless network access to devices within the dwelling. Exemplary wireless networks may comprise wireless local area networks (WLANs) that conform to an IEEE 802.11 (e.g., a, b, g, n, and ac) protocol, femtocells, Bluetooth, Zig-Bee networks, or any other non-public networks.

Under the MoCA standard, orthogonal frequency-division multiple access (OFDMA) enables multiple nodes to simultaneously transmit PHY-frames, each utilizing only a subset of subcarriers. The network controller pre-allocates the OFDMA subcarrier subset to nodes on a mutually exclusive basis, with each OFDMA PHY frame containing reservation requests destined solely for the network controller. The requesting nodes are to synchronize their subcarriers to those of the network controller, adjust their transmissions to ensure simultaneous time-of-arrival at the network controller, and adjust the amplitude of their transmissions as specified by the network controller. If these elements are met, the network controller receives a PHY frame with a payload bitstream that is demultiplexed to recover and forward-error-correction (FEC)-decode each individually transmitted reservation request.

In an exemplary embodiment of the invention, in a network architecture that comprises a full-band D3/Video SoC, the root node device 102 may be operable to isolate the dwelling-based wired network 100 from the street by residing at the root node, rather than after the N:1 splitter 109. In this manner, only MoCA signals may be communicated over the dwelling-based wired network 100 and there are thus no interference issues since the root node device 102 may coordinate the frequency of all signals being communicated over the coaxial cable 107. For example, the root node 102 may receive cable television signals, which may be in the 50 MHz-1 GHz range, and generate MoCA IP packets and communicate the resulting signals over any frequency within the available spectrum provided by the coaxial cables 107. This frees the entire home cable frequency band for MoCA transmission. In other words, there may be no frequency spectrum inside the home that is specifically set aside for cable transmission, or for any other received signals.

In a conventional dwelling-based cable system, set-top boxes are located after the splitter, such as the N:1 splitter 109, so that the entire network receives the input signal provided by the service provider. Thus, a large portion of available spectrum is dedicated to a particular protocol, whether it is being used or not.

However, by converting received signals to MoCA at the root node device 102, only MoCA signals are communicated within the dwelling-based wired network 100, and only the root node device 102 communicates with outside service provider networks, such as cable TV, DOCSIS, satellite, DSL, or fiber-to-the-home networks, for example. Thus, instead of being limited to a particular band outside of a service provider frequency band, the MoCA communications over the dwelling-based wired network 100 has access to the entire frequency range supported by the coaxial cables 107. This is illustrated further with respect to FIG. 2A.

Figure 1B:
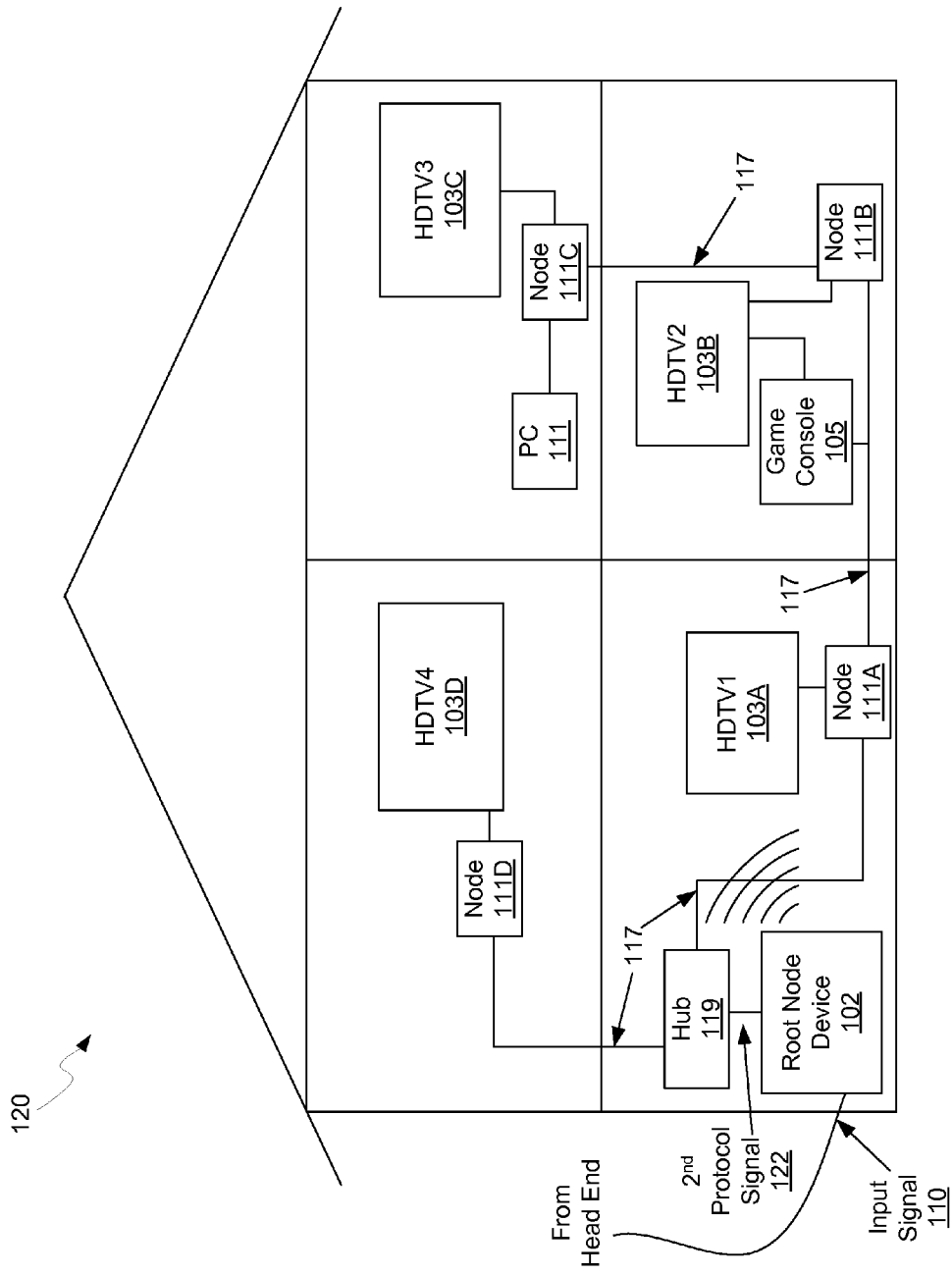
FIG. 1B is a diagram illustrating an exemplary dwelling-based network, in accordance with an embodiment of the invention.

FIG. 1B is a diagram illustrating an exemplary dwelling-based network, in accordance with an embodiment of the invention. Referring to FIG. 1B, there is shown a dwelling-based wired network 120 spanning a plurality of rooms in the dwelling, where each one may have one or more networked devices. There is also shown node devices 111A-111D, the root node device 102, the high-definition televisions (HDTVs) 103A-103D, the game console 105, a hub 119, the personal computer 111, nodes 111A-111D, network lines 117, and an input signal 110. The input signal 110 may be provided by a cable head-end, a fiber-to-the-home service, digital subscriber line (DSL) service, or a satellite signal source, for example.

The wired network 120 is an alternative embodiment to the wired network 100 described with respect to FIG. 1A. Accordingly, the wired network 120 may comprise an Ethernet network, with the network lines 117 comprising Cat 5, 6, or 7 Ethernet cables, for example. Similarly, the hub 119 may comprise an Ethernet hub for providing a plurality of lines for the wired network 120 from a single input line carrying the second protocol signal 122.

The nodes 111A-111D may comprise Ethernet nodes for receiving Ethernet packets and bridging to appropriate signals for target devices. For example, the nodes 111A-111D may receive Ethernet packets and generate video and audio signals to be communicated to the HDTV's 103A-103D.

In another exemplary scenario, the wired network 120 may comprise a power line communications network where the network communications may be transmitted over existing power lines in the dwelling. Accordingly, the hub 119 may be an optional component in instances where the root node device 102 communicates to a plurality of devices, such as the nodes 111A-111D, over the power lines.

Figure 2A:
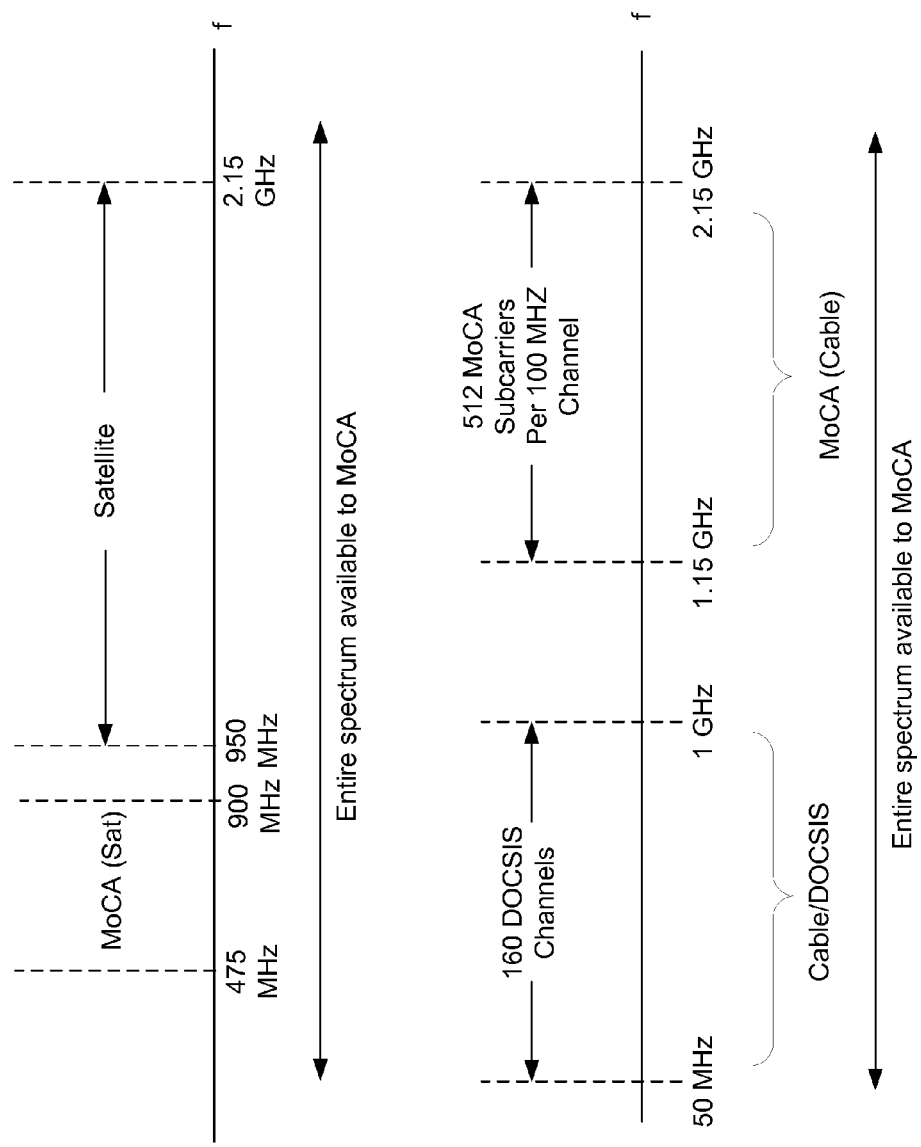
FIG. 2A is a diagram illustrating network frequency spectra, in accordance with an embodiment of the invention.

FIG. 2A is a diagram illustrating network frequency spectra, in accordance with an embodiment of the invention. Referring to FIG. 2A, there is shown an upper frequency spectrum showing a satellite TV band and associated MoCA frequency band, and a lower spectrum showing a cable/DOCSIS frequency band and its associated MoCA frequency band.

In a conventional dwelling-based network, the cable or satellite signal is communicated throughout the network, thereby reserving that frequency band for these communications. However, in an exemplary embodiment of the invention, the service provider signal or signals, may be received by a MoCA root node device, such as the root node device 102 described with respect to FIG. 1A, and converted to MoCA signals to be communicated over the dwelling-based wired network 100. The root node device 102 may therefore only communicate satellite/cable/DOCSIS/etc. with networks/devices external to the dwelling-based wired network 100. Thus, the entire spectrum supported by the coaxial cables may be available to the MoCA network in the dwelling. Accordingly, the root node device 102 may receive cable television signals in the 900 MHz range, for example, and may communicate the resulting MoCA signals in the 500 MHz range if it determines that this frequency is preferred over the 1.15-2.15 GHz range. Frequency selection may be based on the quality of communications in a particular frequency range, which may be determined by a signal strength, a signal-to-noise ratio, and/or a bit error rate, for example.

In addition, the root node device 102 may enable more flexibility in MoCA devices within the dwelling. For example, if a dwelling previously had cable television service and the associated MoCA devices for cable television service, and the dwelling then switched to satellite television, the MoCA devices would normally not be able to function, since the MoCA bands for cable and satellite are different. However, the root node device 102 may enable the use of these MoCA devices no matter for which type of service provider signal they were intended.

Accordingly, the root node device 102 could receive the newly subscribed satellite signals and communicate the resulting MoCA signals over the normal cable television MoCA channels supported by the legacy MoCA devices, thereby enabling the user to continue to use their cable TV-specific MoCA devices despite currently being a satellite television subscriber. Since the root node device 102 may determine what frequency band is used within the dwelling-based wired network 100, the service provider communications protocol signals do not affect devices within the dwelling.

Figure 2B:
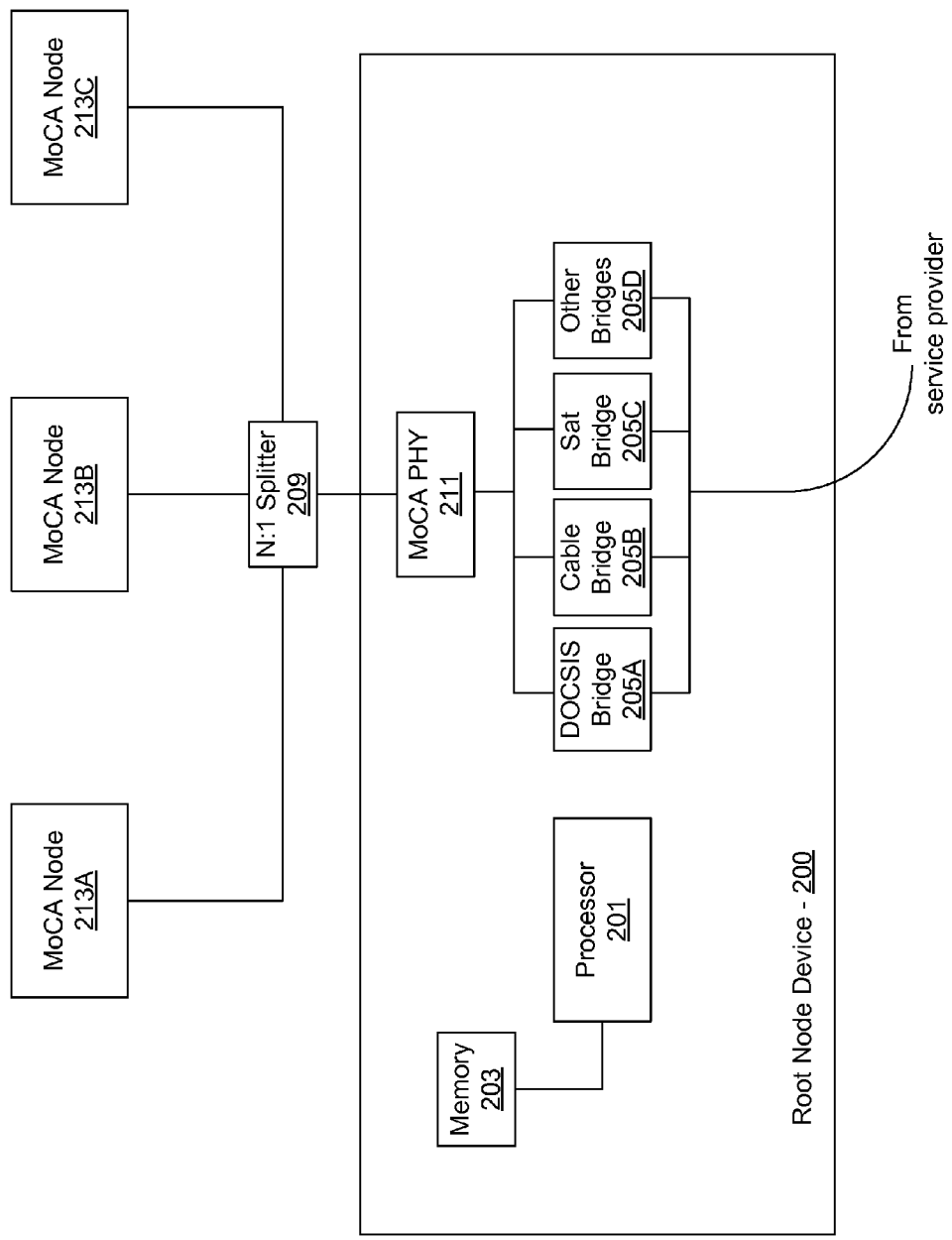
FIG. 2B is a diagram illustrating an exemplary root node network controller, in accordance with an embodiment of the invention.

FIG. 2B is a diagram illustrating an exemplary root node network controller 200, in accordance with an embodiment of the invention. Referring to FIG. 2B, there is shown MoCA nodes 213A-213C, a N:1 splitter 209, and a root node device 200 comprising a processor 201, a memory 203, bridge modules 205A-205D, and a MoCA PHY 211. The root node device 200 may, for example, share any or all characteristics with the root node device 102 discussed previously with regard to FIG. 1.

The processor 201 may be operable to control the operation of the root node device 200. For example, the processor 201 may configure the bridge modules 205A-205D to receive various communications protocol signals and to generate output signals for packetization and further processing in the MoCA PHY 211, and/or may configure MoCA channels to be utilized by the MoCA PHY 211. In another embodiment of the invention, the processor 201 may be utilized to update and/or modify programmable parameters and/or values in a plurality of components, devices, and/or processing elements. At least a portion of the programmable parameters may be stored in the memory 203. In yet another embodiment, the processor 201 may implement any one or more of the bridge modules 205A-205D.

The bridge modules 205A-205D may comprise a DOCSIS bridge module 205A, cable television bridge module 205B, satellite television bridge module 205C, and other protocol bridge module 205D. In an exemplary scenario, the other protocol bridge module 205D may be operable to receive optical signals from a fiber optic cable and convert them to electrical signals that may be communicated via the MoCA PHY 211. A bridge module may, for example, extract data and/or control information from packets received in accordance with a first protocol utilized external to a premises, and then load such information into packets in accordance with a second protocol for communication within the premises. Note that such repacketization may generally be bi-directional as needed.

The MoCA PHY 211 may be operable to communicate signals over coaxial cables, such as the coaxial cables 107, where the signals conform to the MoCA 1.x and/or 2.x standards, to one or more remote MoCA nodes, such as the MoCA nodes 213A-213C. In an exemplary scenario, the MoCA PHY 211 may communicate MoCA signals outside of the conventional MoCA frequency ranges since the entire frequency spectrum supported by the coaxial cables may be available, due to the root node device 200 isolating other protocol signals from the dwelling-based network.

The MoCA PHY 211 transmissions may be PHY frames scheduled in accordance with the Media Access Control (MAC) Layer specifications, and as such may comprise a PHY preamble and a PHY payload and may apply OFDM modulation. The root node device 200 may schedule and broadcast specific start and stop times at which transmissions from each node begin and end, and may be communicated in response to reservation requests. The MoCA PHY 211 may be operable to communicate MoCA signals in any frequency band as configured by the processor 201. In an exemplary scenario, the MoCA PHY 211 may comprise a single transceiver that is operable to communicate over any frequency band that the coaxial cables 107 may support. In another exemplary scenario, the MoCA PHY 211 may comprise a plurality of transceivers, each operable to communicate over a particular range of the frequency spectrum, such as the cable and satellite MoCA channels as shown in FIG. 2A.

The MoCA nodes 213A-213C may comprise generic MoCA devices, such as cable set top boxes with MoCA capability, for example, that may be controlled by the root node device 200. In an exemplary scenario, the MoCA nodes 213A-213C may be operable to receive multimedia data via one or more MoCA channels, as configured by the root node device 200 and generate output video and audio signals to be displayed by an HDTV, for example.

In operation, the root node device 200 may direct network traffic to and from a particular device via any frequency range supported by the coaxial cables in the dwelling-based wired network 100. The root node device 200 may configure the communications links between all other network nodes within the dwelling-based wired network 100.

In an exemplary scenario, the root node device 200 may receive a service provider signal or signals and convert them to MoCA signals that may be communicated to the MoCA nodes 213A-213C. The root node device 200 may therefore communicate satellite/cable/DOCSIS/etc. . . . signals with networks/devices external to the dwelling-based wired network 100, while exclusively communicating MoCA signals to devices within the dwelling-based wired network 100, such as the MoCA nodes 213A-213C. Therefore, since no signals received from external systems or devices are communicated directly into the dwelling-based wired network 100, the entire spectrum provided by the coaxial cables 107 may be available to MoCA network communications (or, for example, to MoCA network communications combined with other premises-based protocol communications independent of signals external to the premises).

Accordingly, the root node device 200 may receive cable television signals in the 900 MHz range, for example, and may communicate the resulting MoCA signals in the 500 MHz range if it determines that this frequency is preferred over the 1.15-2.15 GHz range, normally assigned to MoCA networks incorporating cable TV signals. Frequency selection may be based on the quality of communications in a particular frequency range, which may be determined by a signal strength, a signal-to-noise ratio, and/or a bit error rate, for example.

In a fiber-to-the-home example, an optical signal may be received from a service provider via optical fibers coupled to the root node device 200. Alternatively, the optical signal may be converted to an electrical signal before being communicated to the root node device 200. The other bridges module 205D may convert the optical signals to electrical signals, and process the signals for packetization and other appropriate MoCA processing by the MoCA PHY 211, before being communicated to the MoCA nodes 213A-213C via the N:1 splitter 209.

The separation of MoCA protocol signals within the dwelling-based wired network 100 and other protocols on the external side of the root node device 200 may result in complete frequency spectrum availability within the dwelling-based wired network 100. Aliasing and other interference problems may thus be avoided by configuring the channel usage such that any aliasing will not cause interference, for example.

While FIG. 2B describes cable, satellite, fiber-to-the-home, MoCA, and DOCSIS, communications protocols, any network protocol may be applicable, where the root node device 200 has the capability to communicate via two or more communications protocols. The ability of the network controller to communicate using two or more protocols enables the exclusive communication of MoCA signals within the dwelling-based wired network 100 while still communicating via any other type of communications protocol with service providers.

Figure 2C:
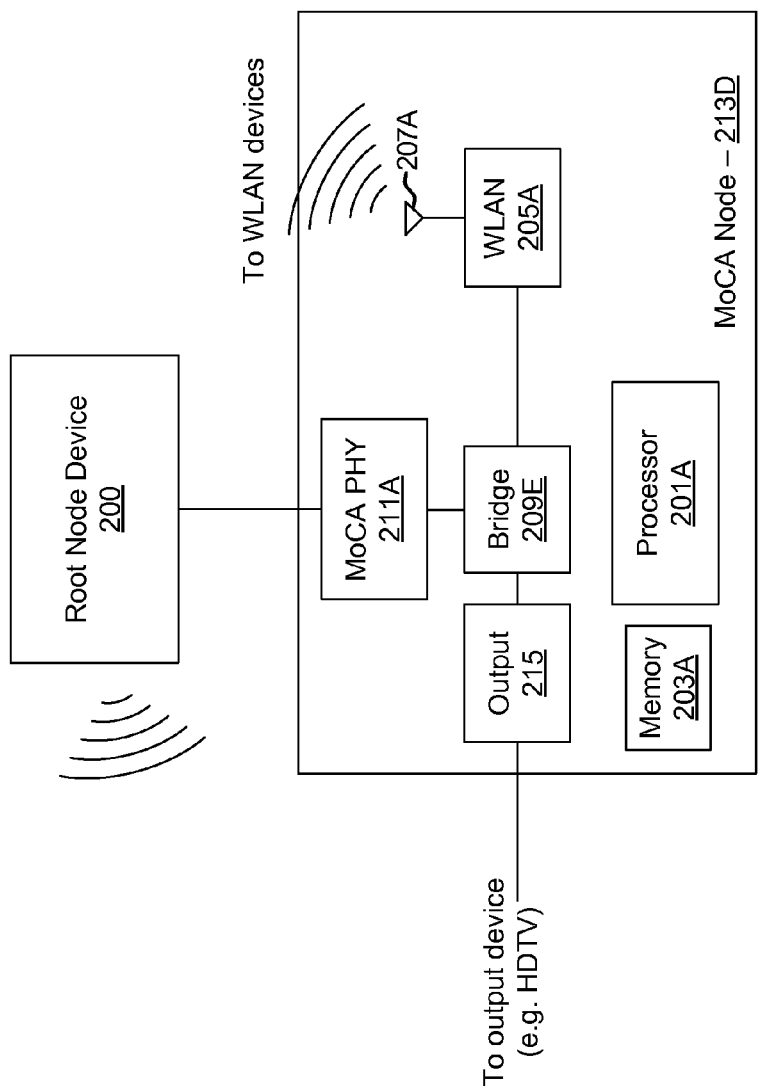
FIG. 2C is a diagram illustrating an exemplary network device, in accordance with an embodiment of the invention.

FIG. 2C is a diagram illustrating an exemplary network device, in accordance with an embodiment of the invention. Referring to FIG. 2C, there is shown a root node device 200 and a MoCA node 213D comprising a processor 201A, a memory 203A, a WLAN module 205A and a MoCA PHY 211A. The processor 201A, the memory 203A, and the MoCA PHY 211A may be substantially similar to the processor 201, the memory 203, and the MoCA PHY 211 described with respect to FIG. 2A, but located within the MoCA node 213D. The MoCA node 213D may, for example, share any or all characteristics with the MoCA Nodes 213A-213C discussed previously with regard to FIG. 2B.

The MoCA node 213D may comprise a networked device such as a MoCA bridge, a set-top box, a personal computer, or a gaming device, and may be controlled (at least in part) by the root node network controller with MoCA SoC 200. For example, the root node network controller with MoCA SoC 200 may configure the channel frequency to be utilized in communication of data between the root node network controller with MoCA SoC 200 and the MoCA node 213D.

By separating MoCA protocol signals from the other communications protocol signals at the root node device 200, i.e., communicating with sources external to the dwelling in the appropriate protocol, but exclusively communicating MoCA signals within the dwelling, more flexibility may be obtained for MoCA devices within the dwelling. This is described further with respect to FIG. 2D.

Figure 2D:
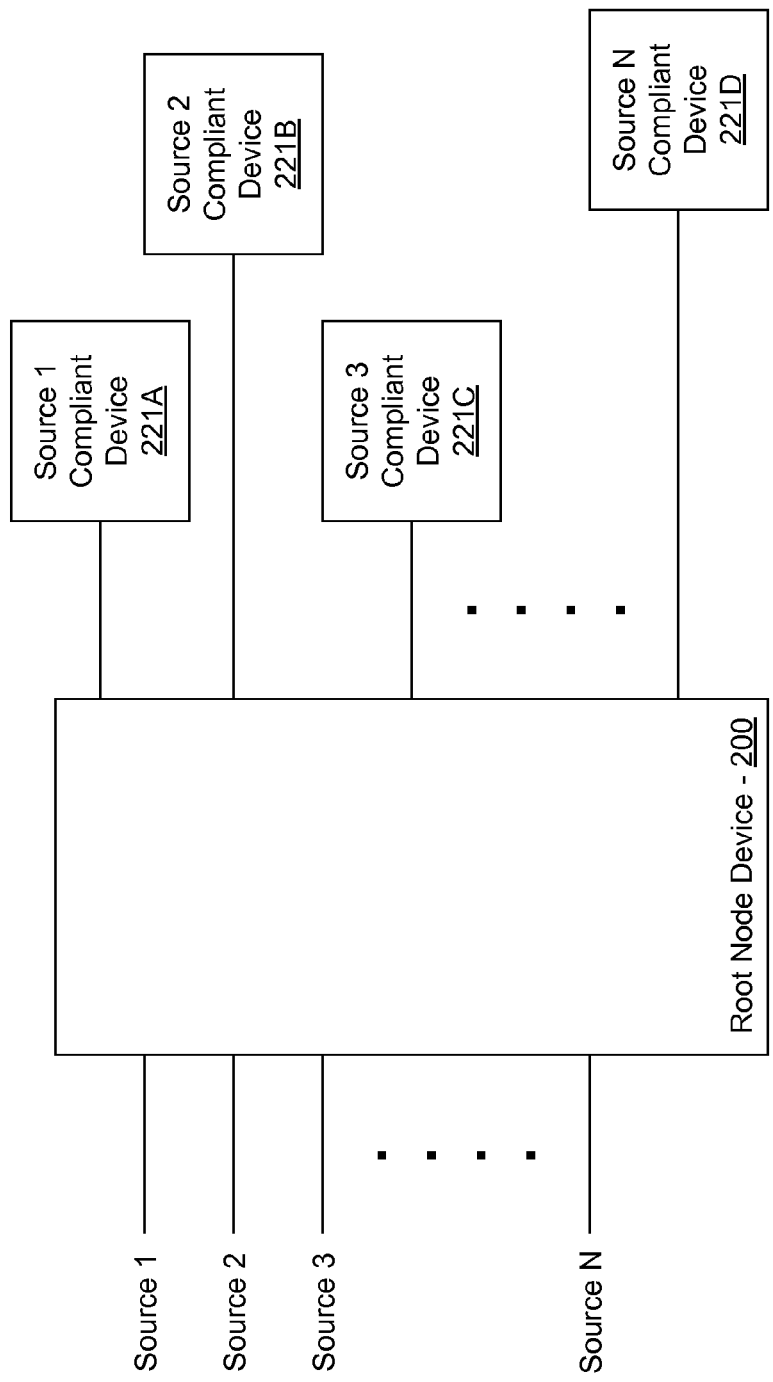
FIG. 2D is a diagram illustrating an exemplary premises-based wired network with multiple-service provider capability, in accordance with an embodiment of the invention.

FIG. 2D is a diagram illustrating an exemplary premises-based wired network with multiple-service provider capability, in accordance with an embodiment of the invention. Referring to FIG. 2D, there is shown the root node device 200 and source 1-N compliant devices 221A-221D. There is also shown a plurality of input signals, source 1-N, which may comprise signals provided by a plurality of different service providers. For example, source 1 may be provided by a cable television head end, source 2 may be provided by a satellite dish mounted to the dwelling, source 3 may comprise a DSL signal provided by a telecom provider, and source N may comprise an optical signal from a fiber-to-the-home provider.

The root node device 200 may be operable to receive source signals from a plurality of providers delivered in compliance with various communications protocols and may then bridge the signals to one or more desired MoCA channels as required by the receiving devices. The root node device 200 may therefore support the use of a plurality of MoCA devices irrespective of the communication protocol for which the devices were designed.

For example, if a dwelling previously had cable television service and associated MoCA devices for cable television service, such as the source 1 compliant device 221A, and the dwelling then switched to satellite television and purchased or rented the source 2 compliant device 221B, the source 1 compliant device 221A would not normally be able to function, since the MoCA bands for cable and satellite are different. However, the root node device 200 may enable the use of source 1 compliant device 221A no matter which type of service provider signal they were intended for, because the root node device 200 may configure the MoCA signals at any frequency supported by the coaxial cables. Accordingly, the root node device 200 could receive the newly subscribed satellite signals and communicate the resulting MoCA signals over the normal cable television MoCA channels to the source 1 compliant device 221A, thereby enabling the user to continue to use their cable TV-specific MoCA devices despite currently being a satellite television subscriber. Since the root node device 200 may determine what frequency band or bands are used within the dwelling-based wired network 100, the service provider communications protocol signals do not affect devices within the dwelling.

The root node device 200 may be operable to determine in which MoCA channels the source 1-N compliant devices 221A-221D are intended to operate, and provide MoCA signals in the appropriate frequency range for each device. For example, if the source 1 compliant device 221A is a cable television compliant device and the source 2 compliant device 221B is a satellite television compliant device, the root node device 200 may communicate ~1-2 GHz signals to the source 1 compliant device 221A and ~400-900 MHz signals to the source 2 compliant device 221B.

Similarly, the root node device 200 may communicate over any frequency range a source 1-N compliant device 221A-221D may operate that is supported by the coaxial cables in the dwelling-based wired network 100. Furthermore, the root node 200 may be operable to configure at which specific channel within the normal MoCA frequency range of the source 1-N compliant devices signals will be communicated. In this manner, interference of signals due to aliasing may be avoided.

Figure 3:
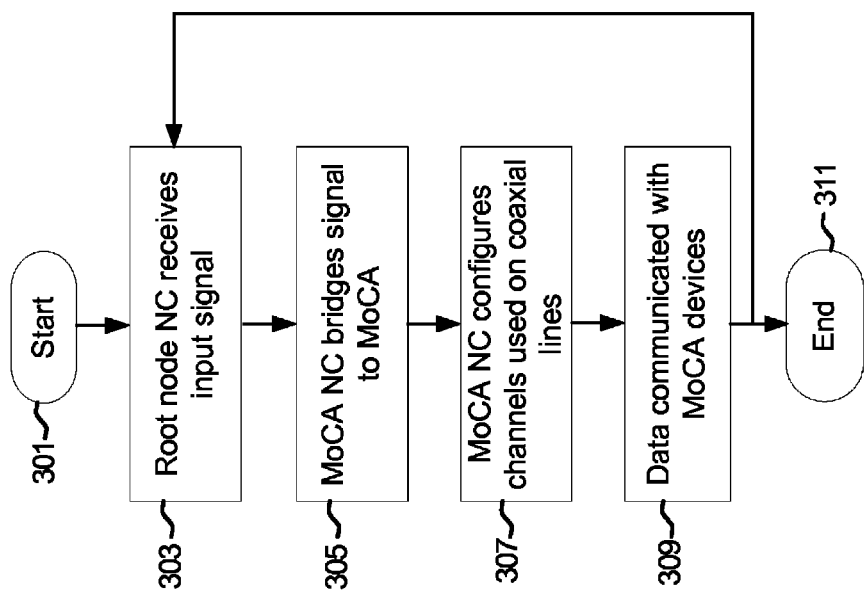
FIG. 3 is a block diagram illustrating exemplary steps in providing a home cable network, in accordance with an embodiment of the invention.

FIG. 3 is a block diagram illustrating exemplary steps in providing a home cable network, in accordance with an embodiment of the invention. The exemplary method illustrated in FIG. 3 may, for example, share any or all functional aspects discussed previously with regard to FIGS. 1A-2C. Referring to FIG. 3, after start step 301, in step 303, the root node network controller with MoCA SoC 200 may receive input signals from an external source such as a head end for example. The head end may comprise cable TV, satellite TV, DOCSIS, and/or fiber-to-the-home signals, for example.

In step 305, the root node network controller with MoCA SoC 200 may bridge the received signals to MoCA signals. Step 305 may, for example and without limitation, share any or all functional aspects discussed previously (e.g., with regard to FIGS. 1A-2C).

In step 307, the root node network controller with MoCA SoC 200 may configure the channel over which the MoCA signals are to be communicated via the coaxial cables 107. For example, the root node network controller with MoCA SoC 200 may configure MoCA signals to be communicated over a frequency range conventionally reserved for MoCA signals in a cable television system, despite being another type of signal, such as satellite television. Since only MoCA signals may, for example, be communicated over the coaxial cables 107, the input signal does not affect what frequency need be utilized.

In step 309, the MoCA data may be communicated to the receiving MoCA devices 213A-213D, followed by end step, or the process may loop back to step 303 if further communications are to occur.

Figure 4:
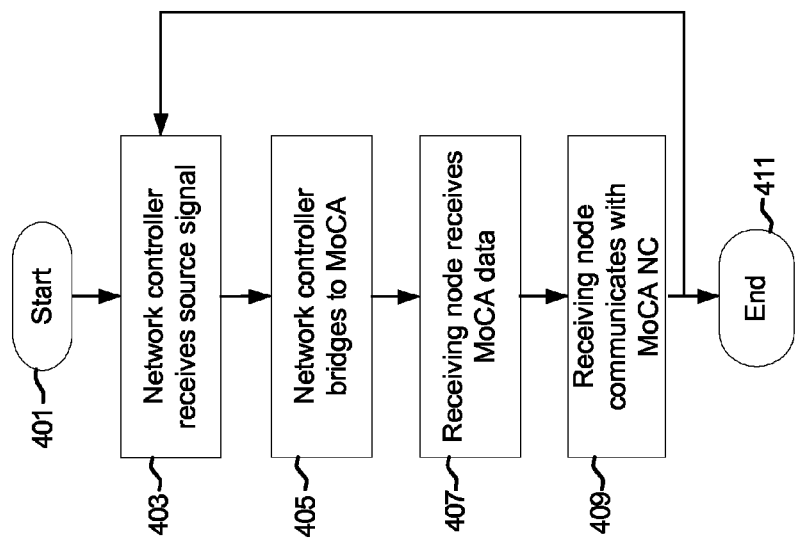
FIG. 4 is a block diagram illustrating exemplary steps in providing a home cable network, in accordance with an embodiment of the invention.

FIG. 4 is a block diagram illustrating exemplary steps in providing a home cable network, in accordance with an embodiment of the invention. The exemplary method illustrated in FIG. 4 may, for example, share any or all functional aspects discussed previously with regard to FIGS. 1A-3. Referring to FIG. 4, after start step 401, in step 403, the root node network controller with MoCA SoC 200 may receive signals comprising a non-MoCA protocol. The received signals may be cable TV, satellite TV, telecom (DSL), or optical (fiber-to-the-home), for example.

In step 405, the root node network controller with MoCA SoC 200 may bridge the received signals to MoCA protocol signals and configure a desired channel to communicate MoCA signals over the coaxial cables 107. Step 405 may, for example and without limitation, share any or all functional aspects discussed previously (e.g., with regard to FIGS. 1A-3).

In step 407, the receiving node or nodes, the MoCA nodes 213A-213D may receive the MoCA signals from the root node network controller with MoCA SoC 200. The MoCA signals may be communicated in any frequency supported by the coaxial cables 107 and the MoCA nodes 213A-213D, notwithstanding the signals received by the root node network controller with MoCA SoC 200 being intended for another protocol or frequency range not supported by the MoCA nodes 213A-213D.

In step 409, the MoCA nodes 213A-213D may communicate an acknowledgement or communicate other desired information back to the root node network controller with MoCA SoC 200 for communication to the head end, such as in DOCSIS communication, for example, followed by end step, or the process may loop back to step 403 if further communications are to occur.

In an embodiment of the invention, a method and system may comprise receiving by a root node device 102, 200 in a premises-based wired network 100, signals that conform to one or more first communications protocols, where the signals may be received from sources external to the premises. The received signals may be bridged to conform to a second communications protocol and communicated to one or more networked devices (e.g., one or more of network devices 101A-101D, 103A-103D, 105, 111, 213A-213D) comprising a television set top box downstream from the root node device within the premises-based wired network 100, where only signals conforming to the second communications protocol may be communicated over the premises-based wired network 100.

The first communications protocol signals may comprise data over cable service interface specification (DOCSIS) signals, cable television signals, satellite television signals, fiber-to-the-home signals, and/or digital subscriber (DSL) signals. The second communications protocol may comprise a multimedia over cable alliance (MoCA) standard, an Ethernet protocol, or a power line communications protocol. The premises-based wired network may comprise coaxial cables 107. The bridged signals may be communicated to one or more networked devices 101A-101D, 103A-103D, 105, 111, 213A-213D at a frequency that is independent of the one or more first communications protocols. The frequency may be configured utilizing the root node network controller 102, 200.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for providing a home cable network.

Accordingly, aspects of the invention may be realized in hardware, software, firmware or a combination thereof. The invention may be realized in a centralized fashion in at least one computer system or in a distributed fashion where different elements are spread across several interconnected computer systems. Any kind of computer system or other apparatus adapted for carrying out the methods described herein is suited. A typical combination of hardware, software and firmware may be a general-purpose computer system with a computer program that, when being loaded and executed, controls the computer system such that it carries out the methods described herein.

One embodiment of the present invention may be implemented as a board level product, as a single chip, application specific integrated circuit (ASIC), or with varying levels integrated on a single chip with other portions of the system as separate components. The degree of integration of the system may primarily be determined by speed and cost considerations. Because of the sophisticated nature of modern processors, it is possible to utilize a commercially available processor, which may be implemented external to an ASIC implementation of the present system. Alternatively, if the processor is available as an ASIC core or logic block, then the commercially available processor may be implemented as part of an ASIC device with various functions implemented as firmware.

The present invention may also be embedded in a computer program product, which comprises all the features enabling the implementation of the methods described herein, and which when loaded in a computer system is able to carry out these methods. Computer program in the present context may mean, for example, any expression, in any language, code or notation, of a set of instructions intended to cause a system having an information processing capability to perform a particular function either directly or after either or both of the following: a) conversion to another language, code or notation; b) reproduction in a different material form. However, other meanings of computer program within the understanding of those skilled in the art are also contemplated by the present invention.

While the invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims.

What is claimed is:

1. A method for communication, the method comprising: in a premises-based network:
   receiving, by a root node network controller in the premises, signals that conform to one or more first communications protocols, said signals received from sources external to said premises;
   bridging said received signals to conform to a second communications protocol different from the first communications protocol; and
   communicating said bridged signals to one or more networked devices within said premises-based wired network, wherein only signals conforming to said second communications protocol are concurrently communicated in at least two frequencies, a first in a frequency range of the first communications protocol and a second in a frequency range of the second communications protocol, the frequency range used by the first communications protocol being different from and not overlapping with the frequency range used by the second communications protocol, over said premises-based wired network.

2. The method according to claim 1, wherein said first communications protocol signals comprise data over cable service interface specification (DOCSIS) signals.

3. The method according to claim 1, wherein said first communications protocol signals comprise cable television signals.

4. The method according to claim 1, wherein said first communications protocol signals comprise satellite television signals.

5. The method according to claim 1, wherein said first communications protocol signals comprise fiber-to-the-home signals.

6. The method according to claim 1, wherein said first communications protocol signals comprise digital subscriber (DSL) signals.

7. The method according to claim 1, wherein said second communications protocol comprises a multimedia over cable alliance (MoCA) standard, an Ethernet protocol, or a power line communications protocol.

8. The method according to claim 1, wherein said premises-based wired network comprises coaxial cables.

9. The method according to claim 1, comprising communicating said bridged signals to one or more networked devices at a frequency that is independent of said one or more first communications protocols.

10. The method according to claim 9, comprising configuring said frequency utilizing said root node network controller.

11. A system for communication, the system comprising:
    one or more circuits for use in a premises-based network, said one or more circuits being operable to:
    receive, by a root node network controller in the premises, signals that conform to one or more first communications protocols, said signals received from sources external to said premises;
    bridge said received signals to conform to a second communications protocol different from the first communications protocols; and
    communicate said bridged signals to one or more networked devices within said premises-based wired network, wherein only signals conforming to said second communications protocol are concurrently communicated in at least two frequencies, a first in a frequency range of the first communications protocol and a second in a frequency range of the second communications protocol, the frequency range used by the first communications protocol being different from and not overlapping with the frequency range used by the second communications protocol, over said premises-based wired network.

12. The system according to claim 11, wherein said first communications protocol signals comprise data over cable service interface specification (DOCSIS) signals.

13. The system according to claim 11, wherein said first communications protocol signals comprise cable television signals.

14. The system according to claim 11, wherein said first communications protocol signals comprise satellite television signals.

15. The system according to claim 11, wherein said first communications protocol signals comprise fiber-to-the-home signals.

16. The system according to claim 11, wherein said first communications protocol signals comprise digital subscriber (DSL) signals.

17. The system according to claim 11, wherein said second communications protocol comprises a multimedia over cable alliance (MoCA) standard, an Ethernet protocol, or a power line communications protocol.

18. The system according to claim 11, wherein said premises-based wired network comprises coaxial cables.

19. The system according to claim 18, wherein said one or more circuits are operable to communicate said bridged signals to one or more networked devices at a frequency that is independent of said one or more first communications protocols.

20. A system for communication, the system comprising:
    a root node network controller for a premises-based wired network and located within the premises, where said network controller is operable to, at least:
    receive signals that conform to one or more first communications protocols, said signals received from sources external to said premises;
    bridge said received signals to conform to a second communications protocol different from the first communications protocol; and
    communicate said bridged signals to one or more networked devices within said premises-based wired network, wherein only signals conforming to said second communications protocol are communicated in at least two frequencies, a first in a frequency range used by the first communications protocol and a second in a frequency range used by the second communications protocol, the frequency range used by the first communications protocol being different from and not overlapping with the frequency range used by the second communications protocol, over said premises-based wired network.

\* \* \* \* \*